United States Patent [19]

Capy

[11] Patent Number: 4,592,711

[45] Date of Patent: Jun. 3, 1986

[54] APPARATUS FOR FABRICATING PLASTIC PARTS

[76] Inventor: Gilbert Capy, La Botte, Jarnioux, Rhone, France

[21] Appl. No.: 557,053

[22] Filed: Dec. 1, 1983

[30] Foreign Application Priority Data

Mar. 10, 1983 [FR] France ............................... 83 04341

[51] Int. Cl.⁴ ................... B29C 45/22; B29C 45/78
[52] U.S. Cl. ..................................... 425/144; 425/562; 425/564; 425/568; 425/569; 425/570
[58] Field of Search ............... 425/143, 144, 159, 562, 425/572, 588, 589, 566, 567, DIG. 229, 557, 564, 577, 135, 150, 549, 561, 568, 569, 570, 574; 239/551, 581, 582; 137/883, 886; 251/249.5

[56] References Cited

U.S. PATENT DOCUMENTS

| 2,536,836 | 1/1951 | Bowling | 251/249.5 |
| 3,561,062 | 2/1971 | Goron | 425/564 |
| 3,849,048 | 11/1974 | Bielfeldt | 425/570 |
| 3,870,445 | 3/1975 | Hold et al. | 425/149 |
| 4,279,582 | 7/1981 | Orsuna-Diaz | 425/159 |
| 4,330,258 | 5/1982 | Gellert | 425/564 |
| 4,332,530 | 2/1984 | Marcinek | 425/577 |
| 4,332,545 | 6/1982 | Cargile | 249/148 |
| 4,378,963 | 4/1983 | Schouenberg | 425/564 |
| 4,380,426 | 4/1983 | Wiles | 425/566 |
| 4,411,609 | 10/1983 | Yoshii et al. | 425/149 |
| 4,435,147 | 3/1984 | Myers et al. | 425/577 |

FOREIGN PATENT DOCUMENTS 519465 3/1955 Italy ..................... 251/249.5

Primary Examiner—Willard E. Hoag
Attorney, Agent, or Firm—Remy J. VanOphem

[57] ABSTRACT

Apparatus for injection molding plastic parts. The method includes the step of melting and pressurizing plastic material, directing the molten pressurized plastic material into passages leading to a mold, a selectively opening shut-off valve disposed along the passages, selectively closing the shut-off valve after a predetermined amount of molten pressurized plastic material has entered the mold and cooling the predetermined amount of molten pressurized plastic material in the mold to form a part. The apparatus includes an extruder providing pressurized molten plastic material, a mold adjacent the extruder, passages interconnecting the extruder with the mold, and a selectively operable shut-off valve disposed along the passage.

11 Claims, 9 Drawing Figures

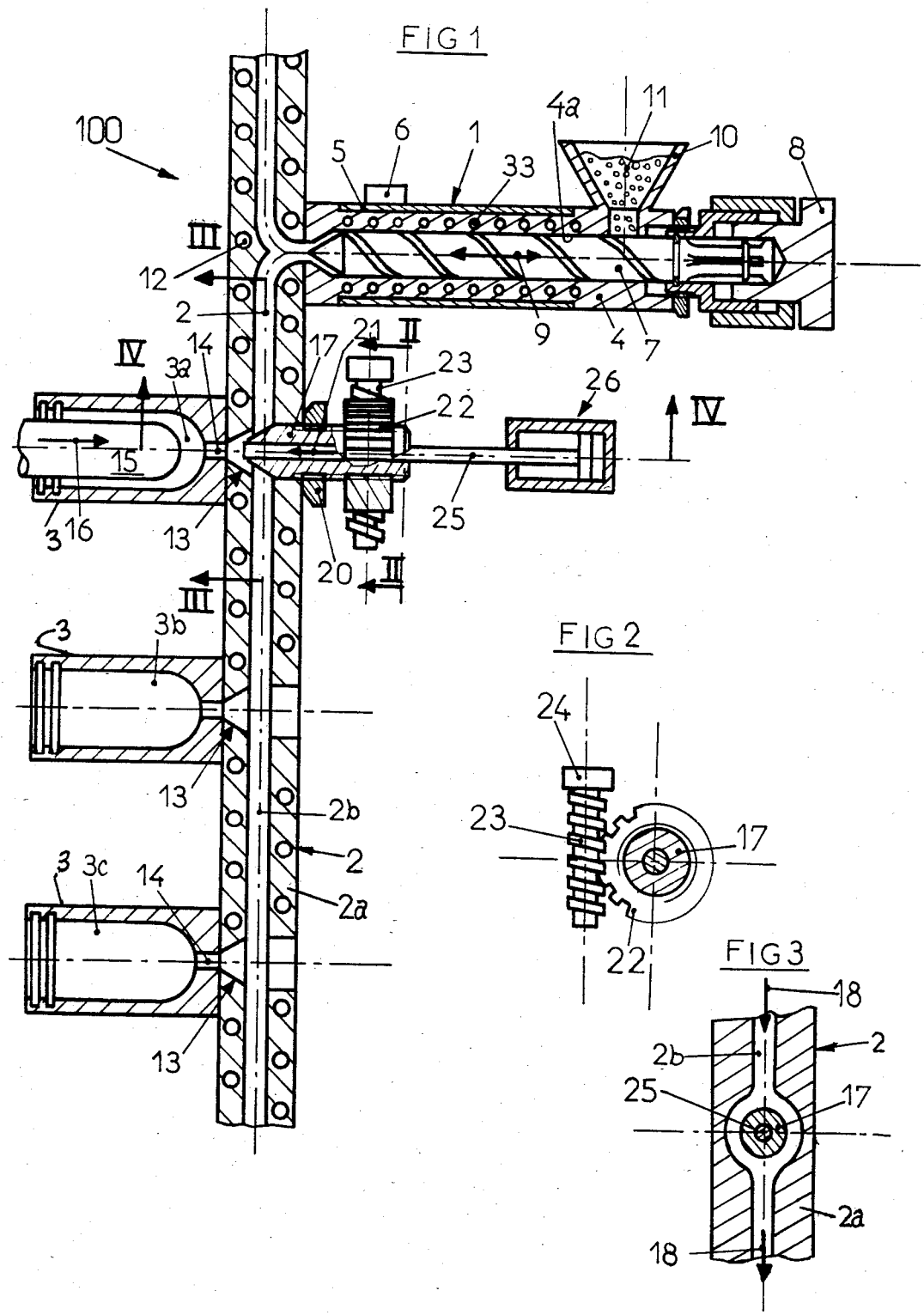

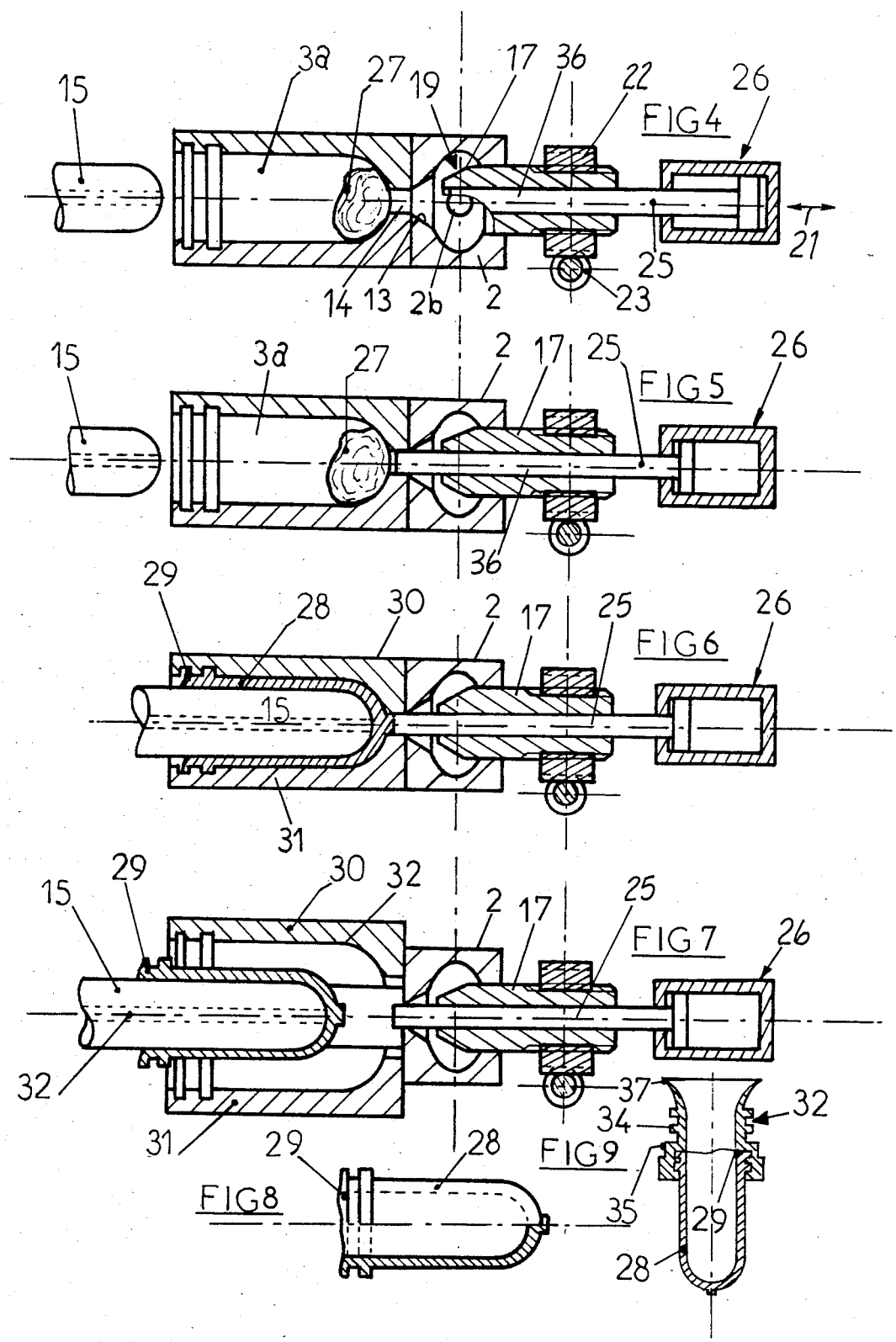

APPARATUS FOR FABRICATING PLASTIC PARTS

BACKGROUND OF THE INVENTION

The present invention relates to a method and an apparatus for injecting plastic into a multi-cavity mold with the aim of fabricating plastic parts.

The principle is known of using a mold having a plurality of cavities into which plastic is injected from a single injection cylinder. Ordinarily the dosing of the material is carried out in a central injection cylinder. The central injection cylinder contains a piston which delivers the material at a high pressure, for example, at more than 500 bars, towards the plurality of cavities. This injection operation occurs in a very short period of time, thus causing a large heat buildup effect due to the friction of the melted molten material against the walls of the runners between the plurality of cavities. Finally, these runners are filled with a plastic which, after solidification and removal from the mold, constitute a temporary spider-like formation interconnecting the molded parts. This temporary spider-like formation is then eliminated, representing a loss of material.

Additionally, when the mold is a reciprocal mold, that is, one into which movable pins are inserted at the moment of injection, the overhanging part on each pin is bent and shifted by the high-pressure flow of the material injected.

SUMMARY OF THE PRESENT INVENTION

The present invention has the aim of avoiding these disadvantages by proposing a device and a process making it possible to inject a predetermined amount of molten plastic material into each of the cavities of a multi-cavity mold, while the time of the cycle is being used efficiently to inject the molten plastic material as slowly as possible.

To achieve this result, an injection device according to the present invention includes an extrusion station of a known type for the extrusion-blowing of thermoplastic materials. That is, an extrusion station is provided having an endless extrusion screw which is continuously rotating and, moreover, is capable of moving in an axial direction. The extrusion station discharges the material into a plurality of runner passages, each of which empties into a cacity through a feed seat capable of being blocked off or uncovered. A gate is provided between each cacity and the runner passages, the gate receiving therein a needle. The front end of the needle is controllable while its rear end is subjected to the action of opening and closing means. This control makes it possible to provide a dose for each cavity of a predetermined quantity of molten plastic material in each cycle. Each cavity is equipped with at least one molding pin which is movably inserted in place after the closing of the gate by the needle, so that the dose of molten plastic material trapped in the cavity is extruded there under the thrust of insertion of the molding pin.

According to another characteristic of the present invention there is provided in the cavity, preferably opposite the gate, a baffle plate into which any excess of material may be discharged to form flash at the end of the operation of inserting the molding pin into the cavity. This flash makes it possible to absorb possible excesses of molten plastic material which can correspond to the residual variations from one cavity to another, which are observed despite the accurate controlling of the dose for each.

The molded parts obtained according to the present invention have flash, the size of which can vary from one part to another. Measuring the variation in this flash from one cycle to another can make possible a fine regulation of the quantity of molten plastic material injected by advancing or retarding, within definite limits, the time of closing of the injector needle. The molded parts can be used as they come when they constitute a semi-finished part, that is, when an element made of another plastic must subsequently be molded onto them which will cover and conceal the flash. Such is the case when the molded parts injected according to the present invention constitute the body of a plastic bottle or pre-bottle, onto the top of which a bottle neck, with or without a matching handle, is to be molded.

According to one of the characteristics of the method according to the invention, the endless extrusion screw rotates constantly during the whole cycle, the variations in the amount injected into the cavities being absorbed by longitudinal movements of this screw, which is subjected to a constant counter-pressure. Thus, the capability exists of injecting the molten plastic material practically continuously into cavities, which are each controlled to the melting temperature, which reduces to the minimum the period of time during which the material is maintained at its melting temperature, while eliminating any danger of an unacceptably high temperature level. Likewise, the needle for regulating and blocking off the flow of molten plastic material into the cavities is, thus, arranged to prevent the appearance of material stagnation zones which would cause the decomposition of the material. The importance this problem assumes will be apparent to those skilled in the art, given that the majority of the plastics used for storing food are relatively unstable and pose problems difficult to solve due to the fact that their melting temperature is close to their decomposition temperature. The characteristics of the molded part produced by injection with these plastics, and particularly its future mechanical performance, are worsened as a function of the magnitude of the heating history of the molded part during its production. Moreover the disadvantage of traditional molding cycles is eliminated; traditional molding cycles alternate periods of intense work with periods of waiting for the material, which result in irregularities still more injurious for the future mechanical performance of the product.

The many objects, features and advantages of the present invention will become apparent to those skilled in the art when the following detailed description is read in conjunction with the attached drawings.

BRIEF DESCRIPTION OF THE DRAWINGS

FIG. 1 is a partial plan view partly in section, of an extrusion cylinder and a mold according to the method and apparatus of the present invention;

FIG. 2 is a sectional view taken along lines II—II of FIG. 1 showing details of the control mechanism for the delivery output for the filling of a cavity of the mold of FIG. 1;

FIG. 3 is sectional view taken along lines III—III of FIG. 1 showing the arrangement of a runner outlining the control system for the delivery output and blocking for the cavity;

FIGS. 4 to 7 are corresponding sectional views taken along line IV—IV of FIG. 1 illustrating the successive phases of the process of injection into one of the cavities of the mold;

FIG. 8 is a partial side elevational view, with an axial half-section, of a part molded according to the present invention; and FIG. 9 is a sectional view of the part of FIG. 8, the control flash of which is concealed after the operation of molding a bottle neck of injected material onto the part of FIG. 8.

DETAILED DESCRIPTION OF THE PREFERRED EMBODIMENT

Referring now to the drawing, and more particularly to FIG. 1, an injection system 100 according to the present invention, is illustrated. The injection system 100 includes an extrusion station 1 delivering the molten plastic material into a distributing runner station 2, which sends it toward a mold having a plurality of cavities 3a, 3b, and 3c.

The extrusion station 1 includes a main body 4, having a longitudinal passageway 4a therethrough. Electrical heating resistances 5 controlled by controllable thermostats 6, and oil cooling circuits 33 are incorporated into the portion of the main body 4 adjacent the longitudinal passageway 4a. An endless extrusion screw 7 rotates continuously inside the longitudinal passageway 4a of the main body 4. The rear end of the endless extrusion screw 7 is, moreover, subjected to the action of a jack 8 capable of causing the flow of material towards the front or the rear of the longitudinal passageway 4a, as indicated by the arrow 9. During the injection operation, the jack 8 subjects the endless extrusion screw 7 to a constant forward pressure, which defines the maximum pressure to which the molten plastic material is subjected.

The main body 4 is surmounted by a feed hopper 10, inside of which granules of plastic 11 are provided.

The walls 2a of the distributing runner station 2 are provided with controlling electrical resistances 12 in each heating zone, whether between the endless extrusion screw 7 and the first cavity 3a for a given distributing runner station, or between the various cavities 3a, 3b, and 3c. These controlling electrical resistances 12 are controllable by a thermostat, not shown. The control of the temperature in the distributing runner station 2 makes it possible to regulate the loss of load in the runner passages 2b to the cavities 3a, 3b, and 3c.

The distributing runner station 2 is provided, at the right of each cavity 3a, 3b, or 3c of the mold, with a fixed seat 13 which interconnects the runner passages 2b with the cavity 3a, 3b, or 3c, through a gate 14 in the mold 3. Each cavity 3a, 3b, 3c is capable of receiving a molding pin 15 at the end of the cavity remote from the gate 14. The molding pin 15 is movable relative to the cavity by the application of a force in the direction shown diagrammatically by the arrow 16.

A nozzle 17, the position of which is controllable, is arranged in the distributing runner station 2 facing each fixed seat 13. Around the nozzle 17, the runner passage 2b is flared, as shown in FIG. 3, so that the plastic material delivered by the endless extrusion screw 7 can circulate along the runner passage 2b, as shown diagrammatically by the arrows 18 and flow from one to another of the cavities 3a, 3b, and 3c. A part of this flow of molten plastic material is diverted in the region of each nozzle 17 towards the gate 14 of the cavity 3a, 3b or 3c adjacent the nozzle after having passed through the dosaging valve 19, best shown in FIG. 4, defined between the fixed seat 13 and the nose of the corresponding nozzle 17.

Each nozzle 17 is threadably mounted onto a fixed support 20, so that when the nozzle is rotated it moves in the axial direction. For example, if the nozzle 17 is rotated in one angular direction it advances in the direction indicated by the arrows 21 as shown in FIG. 1, which tends to reduce the passage section of the dosaging valve 19, thus, reducing the amount of molten plastic material injected into the corresponding cavity 3a, 3b, or 3c.

At its end remote from the fixed seat 13, the nozzle 17 is integral with a pinion 22. The pinion 22 is constantly engaged with a tangent screw 23 provided with a control head 24, as shown in FIGS. 1 and 2. It will be appreciated by those skilled in the art that it is sufficient to turn the control head 24 in order to rotate the nozzle 17 and, thus, regulate the passage section of the dosaging valve 19.

Each nozzle 17 is provided with a longitudinal bore 36, best shown in FIG. 4. A needle 25 is reciprocably disposed in the longitudinal bore 36. The needle 25 is capable of completely plugging the gate 14 of the cavities 3a, 3b, or 3c associated therewith. This plugging operation is accomplished by the thrust of a jack 26 situated at the rear of the needle 25.

The operation of the injection system 100 according to the present invention is as follows.

At the start of a molding cycle, each gate 14 is plugged by a corresponding needle 25. The flow of molten plastic material through the runner passages 2b is then nil. The endless extrusion screw 7, rotating continuously, also describes a retracting motion inside the longitudinal passageway 4a of the main body 4 of the extrusion station 1, since the pressure on the screw head balances the counter-pressure exerted by the jack 8. The temperature of the molten plastic material is kept strictly constant and at the desired value by the set of thermostats 6, electrical heating resistances 5 and oil cooling circuits 33.

At the moment chosen for starting the injection operation, an increased pressure is supplied simultaneously to all of the small sections of the jacks 26 to cause the needles 25 to retract, thereby simultaneously opening all of the gates 14, as shown in FIG. 4. Immediately, a measured dosage 27 of molten plastic material enters each of the cavities 3a, 3b, or 3c. When it is considered that this dosage 27 has reached a desired volume, an increased pressure is supplied to the large section of all the jacks 26, causing each of the needles 25 to advance to plug a corresponding gate 14, as illustrated in FIG. 5. The amount of molten plastic material introduced into each cavity can be reduced by slightly shifting the time of the closing of each cavity, as a function of the size of the flash found on the molded parts made in the previous molding cycle.

A molding pin 15 is driven into each corresponding cavity 3a, 3b, or 3c after the injection operation is complete, as shown in FIG. 6. This has the effect of making the dosage 27 of molten plastic material flow into the space, thus, defined inside the cavity 3. This molten plastic material solidifies to define a molded part 28, depicted in FIGS. 9 and 10, which will be ready to be removed from the mold.

Each of the molding pins 15 constitutes a mold insert and is mounted in a floating manner with respect to its geometric axis. Thus, the hydrostatic pressure exerted on it by the molten plastic material is always balanced.

The definite centering of each molding pin 15 is obtained with respect to the cavity 3a, 3b, or 3c in such a way as to compensate for all of the movements due to thermal expansion. This centering is in effect at the end of the molding pin insertion operation, as depicted in FIG. 6. This centering eliminates the danger of bending of the molding pin 15 during the molding pin insertion operation. Thus, the molded part 28 is assured a constant wall thickness over its entire periphery.

Since the endless extrusion screw 7 rotates continuously, it is its forward motion under the thrust of the piston of the jack 8 which delivers the molten plastic material during the phase of the moving of the needle 25 towards the gate 14. Once the endless extrusion screw 7 is thrust forward, only the pressure generated by the rotation of the endless extrusion screw delivers the molten plastic material.

At the end of the action of driving in the molding pin 15, since the dosage 27 of molten plastic material has been calibrated more or less exactly, any excess plastic flows back around the molding pin 15 away from the gate 14, as depicted in FIGS. 6, 7 and 8, thus, defining a flash 29 on the molded part 28.

After the injection operation and the extrusion operation, the mold is opened by separating the mold halves 30 and 31 defining the cavities 3a, 3b, and 3c, as illustrated in FIG. 7. The subsequent operations of molding on and/or possible preinflation, final cooling and removal of the molding pins 15 from the molded part 28 are done at a different station, not illustrated.

It is seen that the process according to the present invention presumes equality of each of the cavities 3a, 3b, and 3c and of the dosage 27 of molten plastic material which is involved in each cavity. To insure this equality, it is enough for the operator to control the dosaging valve 19 of each cavity 3a, 3b, or 3c by turning the control head 24 of each tangent screw 23. This controlling may be done in a relatively precise manner. However, since slight differences may exist between one cavity 3a, 3b, and 3c and the others, provision is made for the absorption of excess melted plastic material in the form of the flash 29.

The molded part 28 thus obtained, best illustrated in FIG. 8, has the flash 29 at one end. In the example illustrated in FIGS. 8 and 9 it is presumed that the molded part 28 is a pre-bottle intended subsequently to be shaped by blowing to bi-orient its material for the purpose of constituting a packaging bottle, particularly for food products. In this case, a neck 32, intended to constitute the bottle neck of the finished bottle, is injection molded onto the molded part 28. This neck 32 has, for example, a lip 37 for the tight sealing of a cap, a thread 34 for screwing on the cap, and notches 35 provided to make the closure of this cap inviolable. The flash 29 is absorbed in the molding on of the neck 32, which makes it invisible in the finished bottle.

As stated above, the method according to the present invention has the advantages of allowing the endless extrusion screw 7 to rotate continuously, of carrying out the injection operation of injecting a dosage 27 of the molten plastic material into each cavity 3a, 3b, or 3c during a prolonged period in the course of the molding cycle and, finally, of reducing the level of degradation of the plastic during the melting operation by the use of a low rotational speed and of reducing considerably the flow rate of the material in the runner passages 2b. All of these characteristics combine to eliminate the temperature points observed locally in the depths of the molten plastic material, which eliminates any danger of its decomposing, a danger which is particularly great in the production of packagings made of polyvinyl chloride for packaging food.

The above description is by way of example and not by way of limitation. Many variations and modifications from the preferred embodiment described above will be apparent to those skilled in the art and are included within the spirit of the present invention and the intended scope of the claims appended hereto.

What is claimed as novel is as follows:

1. An apparatus for injection molding plastic parts, said apparatus comprising:

extrusion means having an outlet, said extrusion means supplying pressurized molten plastic material to said outlet;

mold means disposed adjacent said extrusion means;

a plurality of cavities formed in said mold means;

a runner means having an elongated passage extending from said outlet of said extrusion means to said plurality of cavities such that said pressurized molten plastic material is available to continuously flow along said elongated passage from said outlet to said plurality of cavities;

a plurality of gates located between said elongated passage and each of said plurality of cavities for communicating said molten plastic material to each of said plurality of cavities;

a plurality of dosage valve means slidably mounted to said runner means, said plurality of dosage valve means disposed adjacent to said plurality of gates, each of said plurality of dosage valve means extending into said elongated passage adjacent a respective gate of said plurality of gates, each of said plurality of dosage valve means having a nozzle member adjustably positioned adjacent said associated gate of said plurality of gates, such as to be selectively movable towards and away from said associated gate to communicate a predetermined dosage of pressurized molten plastic material from said elongated passage along said associated gate of said plurality of gates into said mold means;

means for adjusting the position of said nozzle member of each of said plurality of dosage valve means, said means for adjusting being juxtaposed said nozzle member of each of said plurality of dosage valve means; and shut-off valve means interconnected with each of said plurality of dosage valve means, said shut-off valve means selectively operable to close said mold means to the flow of pressurized molten plastic material from said elongated passage to said plurality of cavities such that a predetermined dosage of molten plastic material supplied to said mold means is metered by selectively opening and closing said shut-off valve means for a predetermined period of time and by the selective positioning of each of said nozzle members with respect to each of said plurality of gates.

2. The apparatus of claim 1 wherein:

each gate of said plurality of gates comprises a cylindrical passageway and an annular valve seat adjacent thereto; and wherein said shut-off valve means comprises a plurality of needle members reciprocably interconnected with each nozzle member of said plurality of dosage valve means, each of said needle members being selectively insertable into a respective gate associated therewith such as to close and open said cylindrical passageway to flow of molten plastic material.

3. The apparatus of claim 1 wherin said extrusion means comprises a main body having a first end and a second end; a longitudinal cavity in said main body extending from said first end to said second end; screw compressor means rotatably and reciprocably disposed in said longitudinal cavity; inlet means in said longitudinal cavity supplying plastic material to said screw compressor means; temperature control means adjacent said longitudinal cavity for maintaining said plastic material at a predetermined temperature level; said outlet for said longitudinal cavity being disposed adjacent said first end of said main body; biasing means mounted to said second end of said main body and said screw compressor means, said biasing means biasing said screw compressor means towards said outlet; and means for rotatably driving said screw compressor means to supply pressurized molten plastic material to said outlet.

4. The apparatus of claim 1 further comprising mold means movably disposed in said plurality of cavities, said mold means being selectively movable within said plurality of cavities towards and away from said gate.

5. The apparatus of claim 4 wherein each said mold pin means comprises a plurality of pins, each pin of said plurality of pins being reciprocable axially towards and away from a respective gate of each of said plurality of gates.

6. The apparatus of claim 1 wherein said means for adjusting the position of said nozzle member further comprises a plurality of pinion members affixed to each of said plurality of dosage valve means; and a plurality of threaded members, each of said plurality of threaded members abutting a respective one of said plurality of pinion members, each of said plurality of threaded members also being axially rotatable to move a respective one of said plurality of pinion members such that an associated nozzle member moves to control the flow rate of said molten plastic material into an associated cavity of said plurality of cavities.

7. An apparatus for injection molding of plastic parts, said apparatus comprising:
constant pressure extrusion means having an outlet, said constant pressure extrusion means supplying pressurized molten plastic material to said outlet;
mold means disposed adjacent said constant pressure extrusion means;
a plurality of cavities formed in said mold means;
a runner means having an elongated passage extending from said outlet to said plurality of cavities such that pressurized molten plastic material is available to continuously flow along said elongated passage from said outlet to said plurality of cavities;
a plurality of gates located between said elongated passage and each of said plurality of cavities, each gate of said plurality of gates having a cylindrical passageway and an annular valve seat adjacent thereto, each of said plurality of gates interconnecting said elongated passage with an associated cavity of each of said plurality of cavities;
a plurality of dosage valves, each dosage valve of said plurality of dosage valves comprising a nozzle member positioned adjacent a respective annular valve seat of said plurality of gates, such as to be movable towards and away from said respective annular valve seat to control the flow rate of pressurized molten plastic material through said associated gate into said associated cavity;
means for selectively adjusting the position of each of said nozzle members, said means for selectively adjusting being juxtaposed said nozzle member;
a plurality of shut-off valves, each shut-off valve of said plurality of shut-off valves being selectively operable to open and close an associated gate of said plurality of gates such that a predetermined dosage of molten plastic material is supplied to said mold means by selectively opening and closing said plurality of shut-off valves for a predetermined period of time and by the selective positioning of each of said nozzle members with respect to said plurality of gates; and
a plurality of mold pin means movably disposed in said plurality of cavities, each mold pin means of said plurality of mold pin means being selectively movable within an associated cavity of said plurality of cavities towards an associated gate of said plurality of gates after said associated cavity has been supplied with said predetermined dosage of molten plastic material.

8. The apparatus of claim 7 wherein each dosage valve of said plurality of dosage valves comprises a needle member reciprocably interconnected with said dosage valve member of said plurality of dosage valves, said needle member being selectively insertable into said gate associated therewith, such as to close and open said cylindrical passageway associated therewith to fluid flow.

9. The apparatus of claim 7 wherein said constant pressure extrusion means comprises a main body having a first end and a second end; a longitudinal cavity in said main body extending from said first end to said second end; screw compressor means rotatably and reciprocably disposed in said longitudinal cavity; inlet means in said longitudinal cavity supplying plastic material to said screw compressor means; temperature control means adjacent said longitudinal cavity for maintaining said plastic material at a predetermined temperature level; said outlet for said longitudinal cavity being disposed adjacent said first end of said main body; biasing means mounted to said second end of said main body and said screw compressor means, said biasing means biasing said screw compressor means towards said outlet; and means for rotatably driving said screw compressor means to supply pressurized molten plastic material to said outlet.

10. The apparatus of claim 7 wherein each mold pin means of said plurality of mold pin means comprises a plurality of pins, each of said plurality of pins being reciprocable axially towards and away from a respective gate of each of said plurality of gates.

11. The apparatus of claim 7 wherein said means for adjusting the position of said nozzle member further comprises a plurality of pinion members affixed to each of said plurality of dosage valves; and a plurality of threaded members, each of said plurality of threaded members abutting a respective one of said plurality of pinion members, each of said plurality of threaded members also being axially rotatable to move a respective one of said plurality of pinion members such that an associated nozzle member moves to control the flow rate of said molten plastic material into an associated cavity of said plurality of cavities.

* * * * *